(12) United States Patent
Bowman et al.

(10) Patent No.: US 8,720,838 B2
(45) Date of Patent: May 13, 2014

(54) ARTICULATING MONITOR ARM WITH CHAIN AND SPRING

(75) Inventors: Stephen J. Bowman, Allentown, PA (US); Bradley A. Derry, Easton, PA (US); Odd N. Oddsen, Jr., Easton, PA (US); David VanDuzer, Slatington, PA (US)

(73) Assignee: Innovative Office Products, LLC, Easton, PA (US)

(*) Notice: Subject to any disclaimer, the term of this patent is extended or adjusted under 35 U.S.C. 154(b) by 0 days.

(21) Appl. No.: 13/266,026

(22) PCT Filed: Jun. 9, 2011

(86) PCT No.: PCT/US2011/039751
§ 371 (c)(1),
(2), (4) Date: Oct. 24, 2011

(87) PCT Pub. No.: WO2011/156569
PCT Pub. Date: Dec. 15, 2011

(65) Prior Publication Data
US 2012/0153117 A1     Jun. 21, 2012

Related U.S. Application Data

(60) Provisional application No. 61/407,007, filed on Oct. 26, 2010.

(51) Int. Cl.
*E04G 3/00* (2006.01)
(52) U.S. Cl.
USPC ............. 248/292.13; 248/280.11; 248/292.11

(58) Field of Classification Search
USPC .................. 248/84.1, 280.11, 281.11, 291.1, 248/292.11, 292.12, 292.13, 917, 276.1; 361/681–683
See application file for complete search history.

(56) References Cited

U.S. PATENT DOCUMENTS

| | | | |
|---|---|---|---|
| 1,564,886 A | * | 12/1925 | O'Neill ......................... 248/568 |
| 3,280,322 A | | 10/1966 | Kirkeby |
| 3,359,927 A | | 12/1967 | Janus |
| 3,498,577 A | | 3/1970 | Mehr |
| 3,820,752 A | | 6/1974 | Oram |
| 3,908,560 A | | 9/1975 | Horner et al. |
| RE28,767 E | | 4/1976 | Kuhlmann et al. |

(Continued)

FOREIGN PATENT DOCUMENTS

| | | |
|---|---|---|
| GB | 659561 A | 10/1951 |
| WO | 2011060224 A1 | 5/2011 |

OTHER PUBLICATIONS

European Patent Office; International Search Report and Written Opinion of the International Searching Authority; Mailed Nov. 30, 2011.

*Primary Examiner* — Tan Le
(74) *Attorney, Agent, or Firm* — Design IP

(57) ABSTRACT

The present application teaches an extension arm including an articulating portion that approximately counterbalances the mass of the articulating portion and any objects connected thereto, for example an electronic device, throughout the positional range of the articulating portion, via the operation of a counter-balancing mechanism. In some embodiments according to the disclosed inventive concepts, the counter-balancing mechanism employs a spring coupled to a chain at a first end, the chain being connected at its opposite end to a pivoting member with which it interacts to support the articulating portion of the extension arm and any objects connected thereto.

14 Claims, 8 Drawing Sheets

(56) References Cited

U.S. PATENT DOCUMENTS

| | | | |
|---|---|---|---|
| 3,973,748 A | 8/1976 | Nagasaka | |
| 4,266,747 A * | 5/1981 | Souder et al. | 248/280.11 |
| 4,447,031 A * | 5/1984 | Souder et al. | 248/281.11 |
| 4,770,384 A * | 9/1988 | Kuwazima et al. | 248/281.11 |
| 4,852,842 A * | 8/1989 | O'Neill | 248/284.1 |
| 5,743,503 A * | 4/1998 | Voeller et al. | 248/284.1 |
| 6,070,839 A | 6/2000 | Brenner et al. | |
| 7,478,786 B2 | 1/2009 | Copeland | |
| 2004/0124328 A1 | 7/2004 | Cvek | |
| 2006/0185563 A1 | 8/2006 | Sweere et al. | |

* cited by examiner

ARTICULATING MONITOR ARM WITH CHAIN AND SPRING

CROSS REFERENCE TO RELATED APPLICATIONS

This application is the U.S. National Stage of PCT Application Serial No. PCT/US11/39751, filed on Jun. 9, 2011, which claims the benefit of PCT International Application No. PCT/US2010/038058, filed Jun. 9, 2010, and U.S. Provisional Application No. 61/407,007, filed Oct. 26, 2010, the entire contents of which are incorporated by reference herein as if fully set forth.

BACKGROUND OF THE INVENTIVE CONCEPTS

The herein disclosed inventive concepts relate to the field of articulating arms for supporting devices, for example electronic displays (e.g., monitors).

Existing articulating arms use a spring or gas cylinder connected to the arm to provide a counterbalance force thereto, so as to support the mass of the articulating arm and any devices attached thereto (e.g., an electronic display) throughout the range of angular positions of the arm. Many known articulating arms are configured to support a device of a known mass or a very narrow range of masses. Some of these known arms use a coiled spring having a fixed, uniform spring rate. In these arms, adjustment of the coiled spring assembly can prove difficult, and it may not be possible to swap between devices of varying mass without changing the internal components of the articulating arm, e.g., the spring, which is both a costly and time-consuming process.

An additional problem relating to coiled spring assemblies is that it may be difficult for them to properly accommodate the combined mass of the arm and the attached device as the articulating arm moves through its range of angular positions. The multitude of individual angular positions of the arm within its range of angular positions can place greatly different counterbalance requirements on the coiled spring assembly, and these counterbalance requirements typically change dynamically as the articulating arm is positioned through said range of angular positions. Because standard coiled springs have a linear force response as they are elongated or compressed, known articulating arms employing coiled springs alone as the counterbalance-force providing means are unable to properly replicate the approximate counterbalance force needed to support the articulating arm (and any device attached thereto) throughout its range of angular positions.

Recent efforts to address this issue have included employing a pivotable clevis member connected to a gas cylinder, the pivotable clevis assembly acting to dynamically adjust the counterbalance force provided by the gas cylinder to the articulating arm as it is positioned throughout its range of angular positions. U.S. Pat. No. 7,748,666, which is incorporated herein by reference as if fully set forth, discloses an exemplary pivotable clevis assembly fuse in articulating arms. Some drawbacks of a continued reliance on the use of gas cylinders include that they are both costly and prone to failure, and that placement of the gas cylinder within the arm limits the ability to decrease the overall size of the articulating arm. Further, gas cylinders lose strength over time, and therefore must be periodically replaced. Moreover, the use of a pivotable clevis member adds an additional amount to the overall cost of producing the articulating arm.

Further, as electronic displays have become smaller and lighter, it is desirable to produce articulating arms having slimmer profiles, for example for aesthetic purposes. Reducing the size and weight of an articulating arm also reduces the cost of producing said arm, due to material costs savings. Maintenance of the spring or gas cylinder within an articulating arm limits the potential for reducing the size of the articulating arm.

Therefore, new extension arm assemblies which overcome these and other problems are desired.

SUMMARY OF THE INVENTIVE CONCEPTS

In one respect, the present application discloses an extension arm having an articulating portion for supporting an object, the extension arm comprising a base member that is releasably connectable to a support surface, an endcap that surrounds the base member, the endcap containing a spring therein, the spring having a central cavity located interior to a coiled portion thereof, a pivoting member attached to the arm, the pivoting member adapted to rotate with the articulating portion within the endcap as an angular position of the articulating portion is adjusted, the pivoting member located exterior to and on a first side of the central cavity, and a rigid element that runs through the central cavity, wherein a first end of the rigid element located exterior to and on the first side of the central cavity is manipulated by movement of the pivoting member, and a second end of the rigid element is attached to the endcap approximately at or exterior to a second side of the central cavity.

In another respect, the present application discloses an extension arm having an articulating portion for supporting an object, the extension arm comprising an endcap located at a first end of the articulating portion, the endcap having at least two attachment points for connecting with the articulating portion and a pivoting member located therein, a spring tube located interior to the endcap, the spring tube enclosing a spring therein, and a rigid element that runs through a central cavity of the spring, attaches at a first end on a first side of the spring tube to the pivoting member, and attaches at a second end on a second side of the spring tube to the endcap.

In yet another respect, the present application discloses an extension arm for supporting an object, the extension arm comprising a base member that is releasably connectable to a support surface and a parallelogram portion connected to the base member, the parallelogram portion comprising a first endcap, a second endcap, an upper channel member, and a lower channel member, both the upper and lower channel members having a cross-sectional profile approximating a "U"-shape, a first surface corresponding with a closed side of the "U"-shape, and a second surface corresponding with an open side of the "U"-shape, the first and second surfaces directly opposing each other, wherein the second surface of both the upper and lower channel members face downwardly when the base member is mounted to a horizontal support surface.

BRIEF DESCRIPTION OF THE DRAWINGS

The present inventive concepts will hereinafter be described in conjunction with the appended drawing figures wherein like numerals denote like elements.

DETAILED DESCRIPTION OF THE PREFERRED EMBODIMENTS

Figure 1:
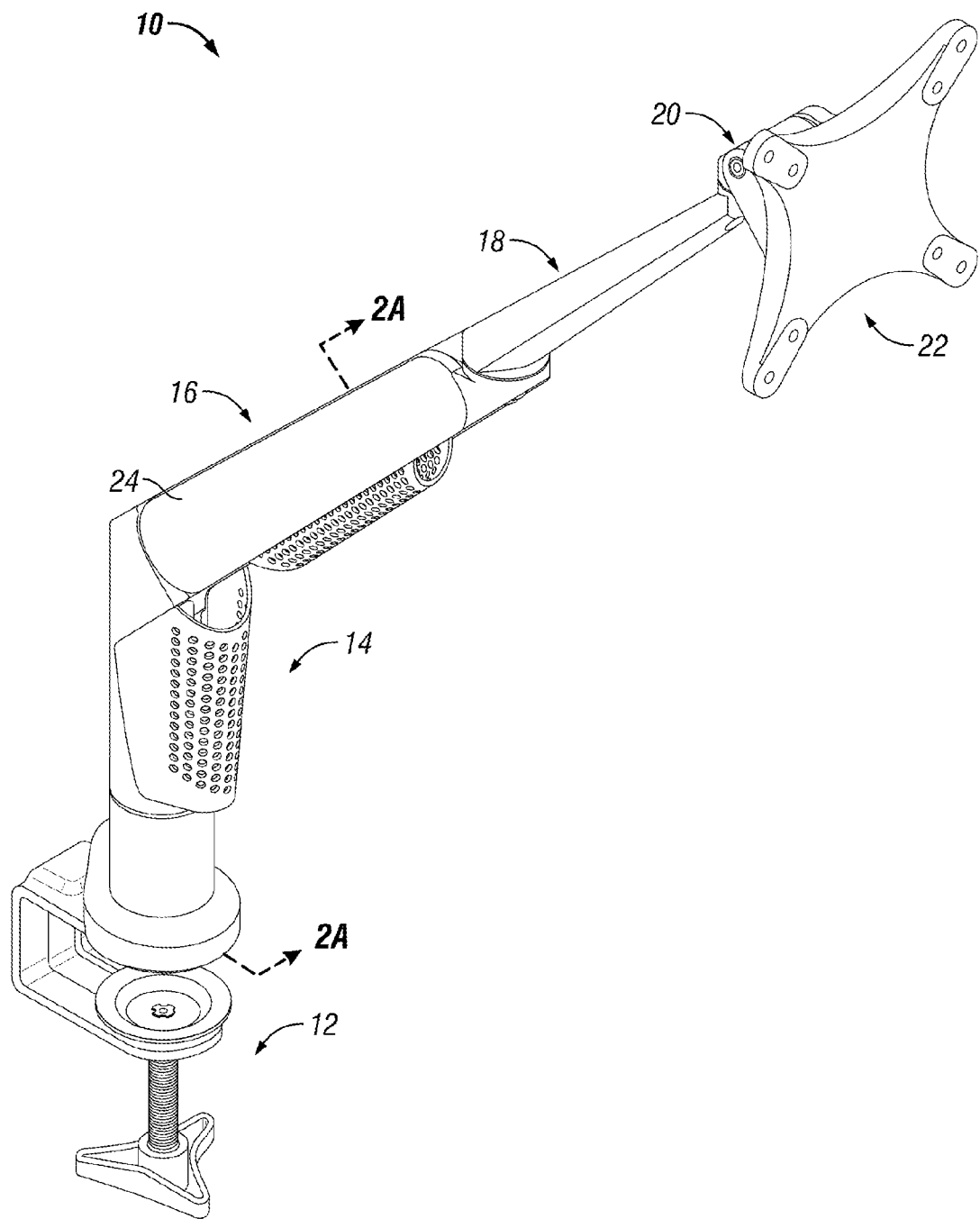
FIG. 1 is a perspective view of a first embodiment of an extension arm in accordance with the present inventive concept, with the articulating portion in a first angular position.

The ensuing detailed description provides preferred exemplary embodiments only, and is not intended to limit the scope, applicability, or configuration of the herein disclosed inventive concepts. Rather, the ensuing detailed description of the preferred exemplary embodiments will provide those skilled in the art with an enabling description for implementing the preferred exemplary embodiments of the inventive concepts. It should be understood that various changes may be made in the function and arrangement of elements in these embodiments without departing from the spirit and scope of the inventive concepts, as set forth in the appended claims.

To aid in describing the inventive concepts or specific embodiments thereof, directional terms may be used in the specification and claims to describe portions of the present embodiments (e.g., upper, lower, left, right, etc.). These directional definitions are merely intended to assist in describing and claiming the inventive concepts and are not intended to limit the inventive concepts in any way. In addition, reference numerals that are introduced in the specification in association with a drawing figure may be repeated in one or more subsequent figures without additional description in the specification in order to provide context for other features.

For the purposes of the specification and claims, the term "connected" means that two or more parts are affixed, coupled, fastened, joined, linked, and/or united, either directly or indirectly through one or more intermediate parts.

For purposes of the specification and claims, the term "horizontal" means a plane that lies orthogonal to lines drawn along the respective rotational axes of the endcaps which are connected to the articulating portion. For purposes of the herein specification and claims, it is to be assumed that the various embodiments of the extension arm are mounted to a support surface such that "horizontal" corresponds with a plane that is orthogonal to the direction of the force of gravity under normal conditions. In this configuration, when the articulating portion of the extension arm is in a 0-degree angular position, i.e. such that a line drawn along the upper surface of the articulating portion is orthogonal to said rotational axes of the endcaps, the line drawn along the upper surface of the articulating portion is also orthogonal to the direction of the force of gravity. It should be understood that any of the embodiments of the articulating portion disclosed herein could also be mounted to a support surface such that the 0-degree angular position of the articulating portion is not perpendicular to the direction of the force of gravity.

Referring now to the figures, FIGS. 1-6B generally depict a first embodiment of an extension arm 10 according to the present inventive concept. Referring to FIG. 1, in this embodiment, the extension arm 10 has a support mount 12 for connecting to a support surface, a base portion 14, a lower arm 16, an upper arm 18, a tilter 20, and a device mount 22 for connecting to a user device, for example a flat-screen monitor. The support mount 12 may be connected to any known support surface, for example a desk or table. In the alternative, other known mounting means may be used to support the extension arm 10, including but not limited to a bolt-through mount, flat mount, or slatwall mount. In this embodiment, the upper arm 18 comprises a rigid forearm that is angled at approximately +45 degrees from the support mount 12 (i.e. parallel to the angular position of the lower arm 16 in FIGS. 1 and 2A). In alternate embodiments, the upper arm 18 may extend at any desired angle from the lower arm 16, for example parallel to the support mount 12. In further alternate embodiments, the upper arm 18 may include cable-management clips or retainers for supporting and/or concealing user device cables from external view when routed along the upper arm 18. In this embodiment, the interaction of the upper arm 18, tilter 20, and device mount 22 provide for adjustability along all three coordinate axes so that the attached user device can be positioned in any user-desired position and orientation. The device mount 22 of this embodiment comprises two sets of industry-standard mounting holes (not labeled), for example for attachment to a monitor having either of a VESA 75-mm or VESA 100-mm bolt pattern. It should be understood that other known tilter and device mount apparatuses may be used in place of the tilter 20 and device mount 22 of the present embodiment within the scope of the present inventive concepts.

Figure 2A:
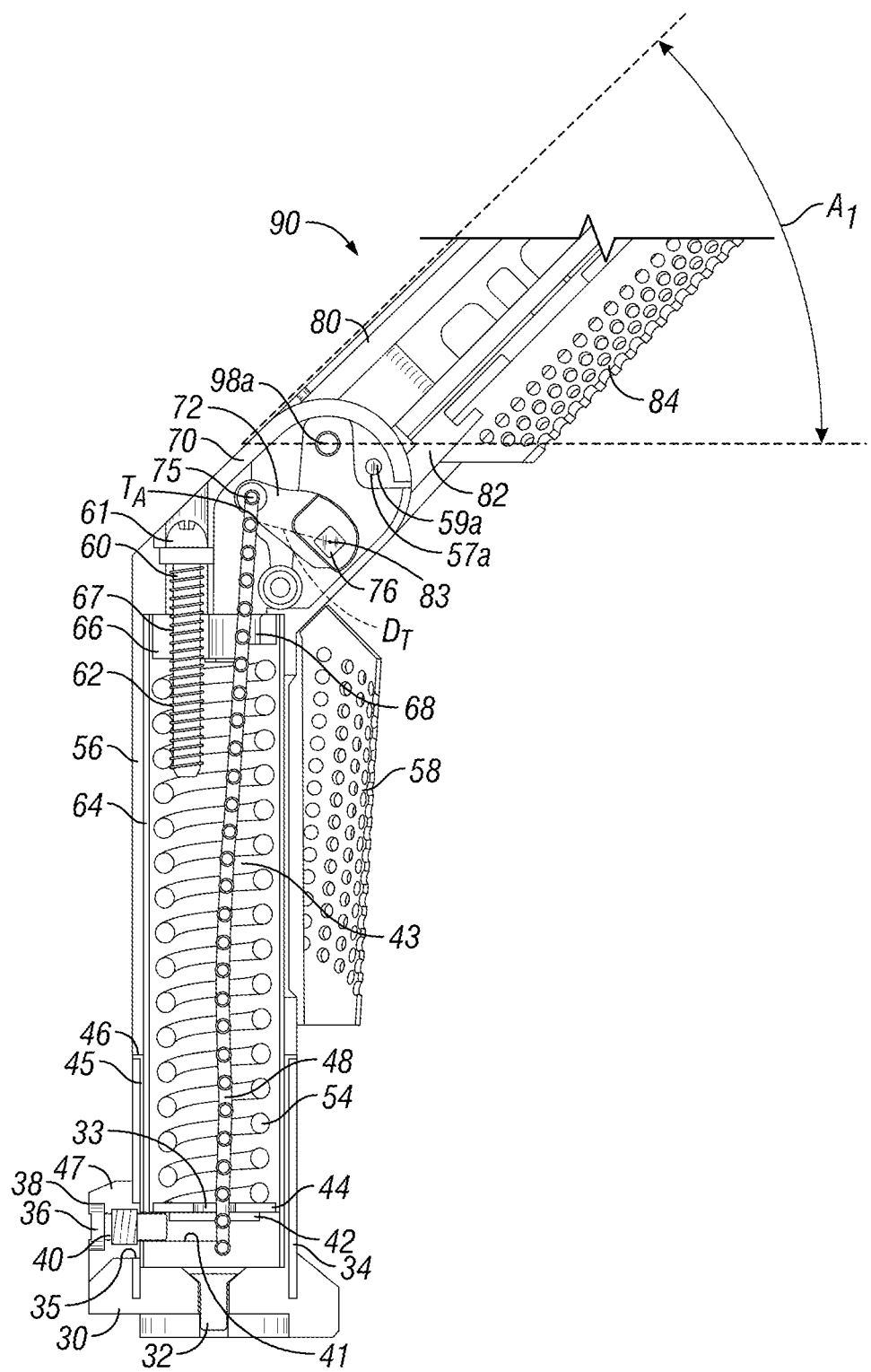
FIG. 2A is a sectional view taken along line 2A-2A of FIG. 1.

Referring now to FIG. 2A, the support mount 12 is connected to the base portion 14 via a screw 32, which attaches a base plate 30 to the support mount 12. When mounted in this configuration, the base plate 30 is placed at least partially in contact with the support surface. The base portion 14 further includes a mount cup tube 34, which rests into a groove (not shown) in the base plate 30, a spring tube 64 which rests inside of the mount cup tube 34, and a bushing 45 having a lip 46 that rests between the spring tube 64 and the mount cup tube 34. In this embodiment, the bushing 45 is a split bushing, though it should be understood that in alternate embodiments the bushing 45 could have a solid body. The bushing 45 allows for rotational freedom between the spring tube 64 and the mount cup tube 34 without the spring tube 64 and the mount cup tube 34 rubbing against one another. In this embodiment, the bushing 45 is comprised of plastic, though it should be understood that any suitable material may be used instead of plastic for the bushing 45.

The spring tube 64 has a spring tube slot 41, which accommodates passage of a tension screw 36 therethrough. As seen in FIG. 2A, the tension screw 36 extends both internal and external to the spring tube slot 41. The external portion of the tension screw 36 is hidden from view by a screw cover 47 having a screw slot 38. In this embodiment, the spring tube slot 41 wraps slightly more than 180 degrees around the circumference of the spring tube 64, so that the spring tube 64 has approximately 180 degrees of rotational freedom (approximately 90 degrees of rotation freedom in either direction from the position shown in FIG. 2A) before the shaft of the tension screw 36 abuts the edge of the spring tube slot 41, thereby preventing further rotation of the spring tube 64 in that direction. The mount cup tube 34 also has a mount cup hole 35 which permits passage of the tension screw 36 therethrough. Because the mount cup tube 34 does not rotate with the spring tube 64, the mount cup hole 35 is only slightly larger than the threaded portion of the tension screw 36.

Figure 3:
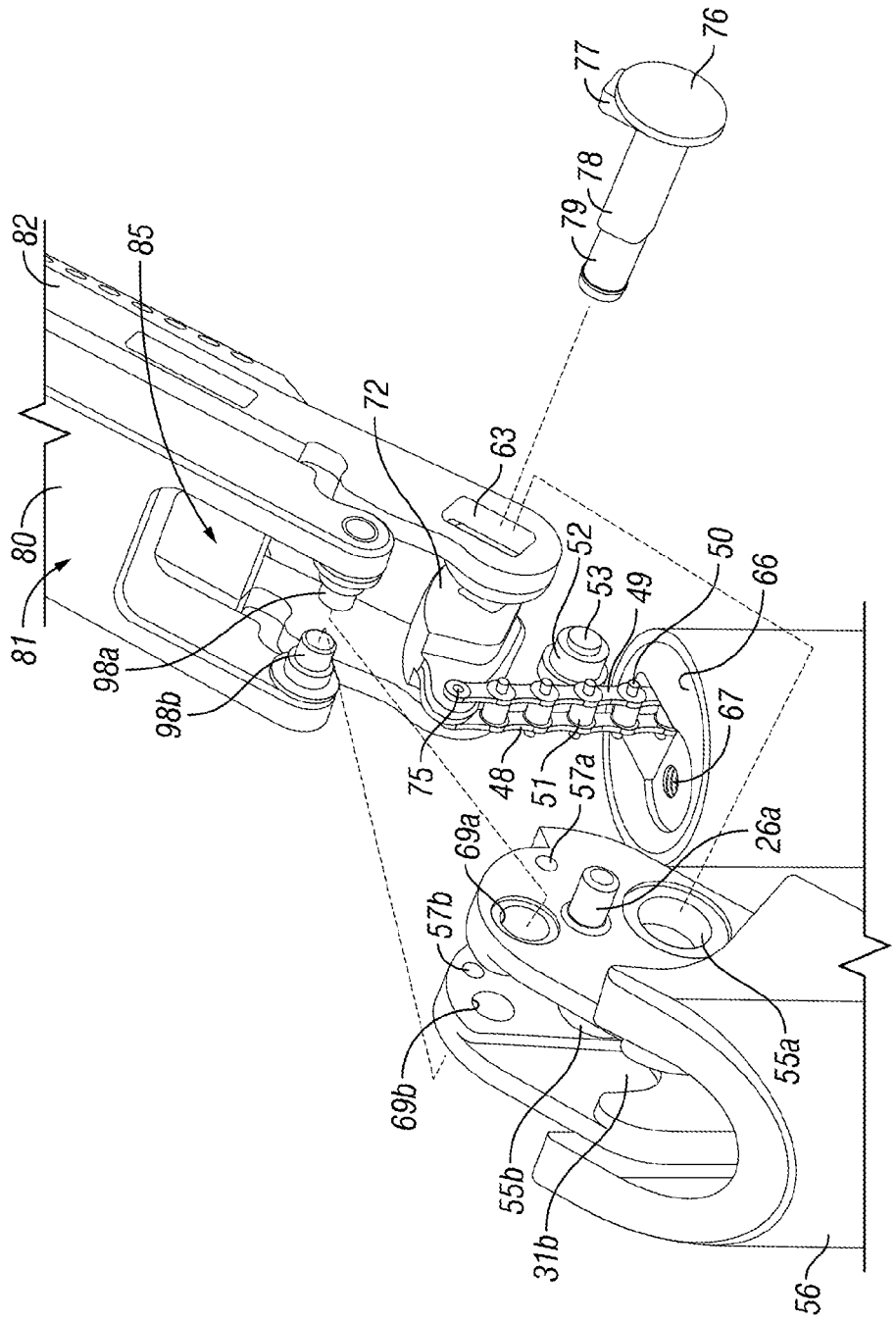
FIG. 3 is a partial exploded view of some components of the extension arm of FIG. 1.

Located within the spring tube 64 are a spring 54 and a rigid element 48, which in this embodiment is a chain. As described in greater detail below, the chain 48 passes through a central cavity 43 defined by the coiled portion of the spring 54 and is fixed in place at its first and second ends which are located, respectively, above and below the spring tube 64. In this embodiment, as best seen in FIG. 2A, the spring 54 has the approximate shape of a truncated cone, though it should be understood that other shapes for the spring 54 are possible within the scope of the present inventive concepts, for example cylindrical, hour-glass, or barrel shapes. In this embodiment, the spring 54 and spring tube 64 are oriented vertically when the extension arm 10 is mounted to a horizontal support surface. In this embodiment, the chain 48 is a link-style chain such as those that are commonly used for bicycle gear systems. Referring to FIG. 3, the chain 48 is comprised of a plurality of chain links 49, which are connected to one another via a plurality of chain pins 50. Surrounding each of the plurality of chain pins 50 is a chain pin roller 51, which is tubiform in shape and is free to rotate about its respective chain pin 50. The operation of the chain pin rollers 51 will be discussed in greater detail below.

Referring back to FIG. 2A, the lower end of the chain 48 passes through a central hole 33 of a washer 44, where it is held in place via placement of a chain compression pin 42 which is placed below the washer 44 between a pair of chain pins 50. To configure the extension arm 10 for use, the user pre-selects a desired compression state of the spring 54 according to the mass of the attached user device. When the necessary tension state of the spring 54 has been selected, the restorative force of the spring 54 which acts downwardly on the washer 44 and the chain compression pin 42 is sufficient to fix the position of the bottom end of the chain 48 a certain distance from its equilibrium position.

Located at the top end of the spring tube 64 is a spring adjuster 66 having a threaded, bolt-engaging portion 67 and a chain passage hole 68. The position of the spring adjuster 66 within the spring tube 64 is adjustable via rotation of a bolt 60 in order to change a compression state of the spring 54. As the head 61 of the bolt 60 is turned in either a clockwise or counter-clockwise direction, the threaded portion 62 of the bolt 60 interacts with the bolt-engaging portion 67 of the spring adjuster 66 to move the spring adjuster 66 upwardly or downwardly, accordingly, within the spring tube 64. For example, as the spring adjuster 66 is moved downwardly against the spring 54, the compression state of the spring 54 is increased, thereby increasing the restorative force generated by the spring 54. Conversely, as the spring adjuster 66 is moved upwardly within the spring tube 64, the compression state of the spring 54 is decreased, thereby decreasing the restorative force generated by the spring 54. In this way, the compression state of the spring 54 may be pre-selected according to the mass of the attached user device.

Surrounding the spring tube 64 is an endcap 56, to which a device cable cover 58 is releasably attached. The device cable cover 58 may be used to at least partially conceal device cables from external view as they are routed about the base portion 14. In this embodiment, the device cable cover 58 has a plurality of perforations (not labeled) for aesthetic purposes. In alternate embodiments, the perforations could be omitted, or the device cable cover 58 may be omitted entirely. In this embodiment, the endcap 56 is fit over the spring tube 64 and rests on top of the lip 46 of the bushing 45. When the compression state of the spring 54 has been selected, the tension screw 36 is installed. In addition to providing the rotation stop feature described above, the tension screw 36 holds the endcap 56 in place. Located along the threaded portion of the tension screw 36 is a threaded insert 40, which is held in place against the spring tube 64 by being sized slightly larger than the spring tube slot 41. The threaded insert 40 holds the tension screw 36 in position. In this embodiment, the endcap 56 has a first section that contains the spring tube 64 and the spring 54, and a second section that contains at least two attachment points with the articulating portion 90 and the pivoting member 72. In this embodiment, the second section is angled or offset with respect to the first section.

Within the endcap 56 are a pair of link roller pin slots 31a, 31b (31a not shown) in which are supported opposing ends of a link roller pin 53 (see FIG. 3). Rotatably surrounding the link roller pin 53 is a link roller 52, which is sized so as to be slightly smaller than the width of the chain links 49. As best seen in FIG. 3, the link roller 52 has a shorter length than the link roller pin 53 so that the link roller 52 can freely rotate within the endcap 56 about the link roller pin 53. As the position of the chain 48 is adjusted upwardly or downwardly within the spring tube 64, the chain pin rollers 51 may come in contact with and roll against the link roller 52. The interaction between the chain pin rollers 51 and the link roller 52 ensures a smooth movement of the chain 48 as the pivoting member 72 is rotated, and prevents damage to the chain 48 from occurring. In this embodiment, an endcap cover 70 is attached to the endcap 56 via a pair of extensions (not labeled) which sit partially within the link roller pin slots 31a, 31b and via a pair of endcap pins 59a, 59b (59b not shown) that connect, respectively, between the endcap pin holes 57a, 57b located on the endcap 56 and a corresponding pair of endcap cover pin holes (not shown) which are located on the endcap cover 70.

Figure 6A:
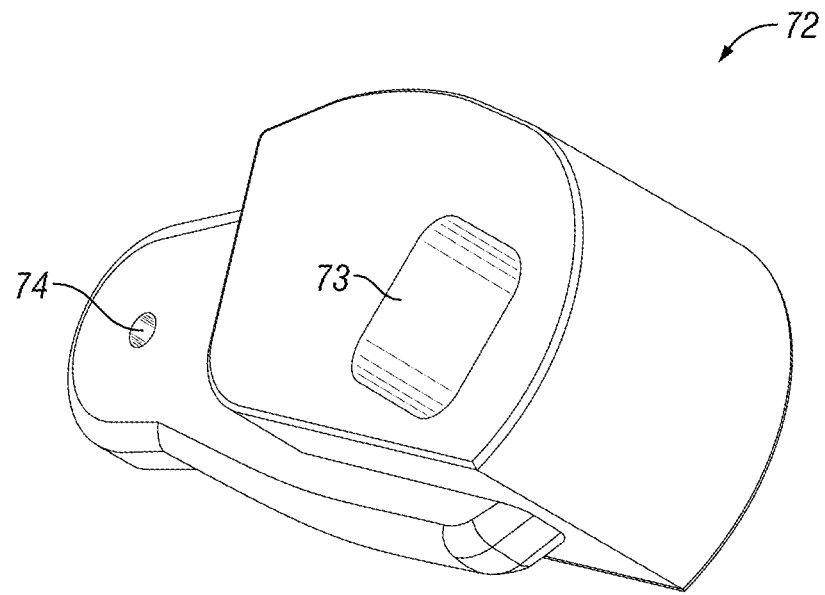
FIG. 6A is a front perspective view of one embodiment of a pivoting member in accordance with the present inventive concept.
Figure 6B:
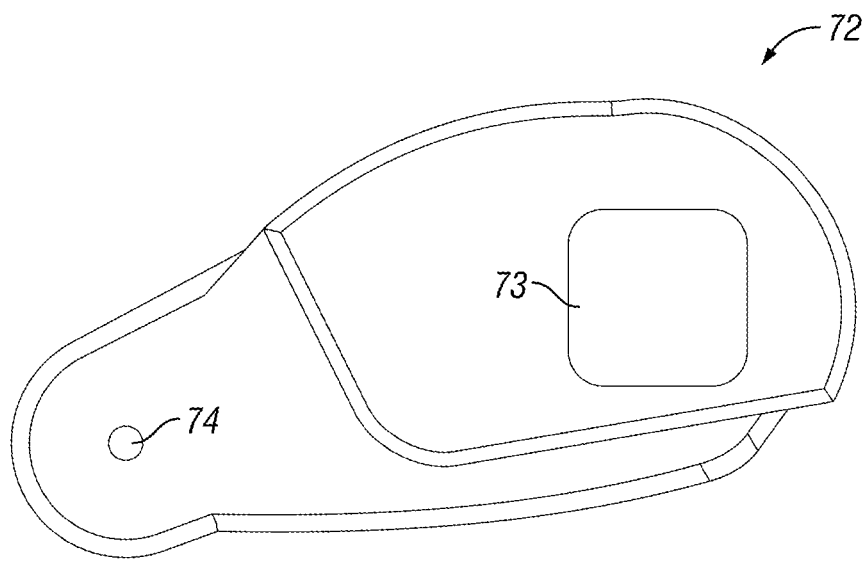
FIG. 6B is a side view thereof.

In this embodiment, the chain 48 is connected at its top end via a connecting pin 75 to a chain connection hole 74 of a pivoting member 72 (see FIGS. 2, 3, and 6A). At its other end, the pivoting member 72 is attached to the endcap 56 and the lower channel member 82 via an axle pin 76. As best seen in FIG. 3, the axle pin 76 has a hole-engaging portion 77, a rectangular portion 78, and a cylindrical portion 79. When the axle pin 76 is installed in the axle pin holes 55a, 55b of the endcap 56, the hole-engaging portion 77 of the axle pin 76—which in this embodiment is rectangular-shaped—attaches to the lower channel member 82 via a complementary-shaped axle pin hole 63. Thus, adjustment of the angular position of the lower channel member 82 will affect the rotational position of the axle pin 76. The rectangular portion 78 of the axle pin 76 is non-circular in cross-section and sized and shaped so as to firmly fit within and engage the axle pin slot 73 of the pivoting member 72 (see FIGS. 6A and 6B). The cylindrical portion 79 of the axle pin 76 sits within the axle pin hole 55b and an axle pin hole 65 on the lower channel member 82, and can freely rotate there within (i.e., the cylindrical portion 79 does not engage with the axle pin holes 55b, 65). The axle pin slot 73 also has a centerpoint 83, which is located at the center of the area of the axle pin slot 73 and corresponds with an axis that runs perpendicular to the page in FIG. 2A. The axle pin 76 is held in place by a pin retainer (not shown), which attaches around the end of the cylindrical portion 79 of the axle pin 76 which extends out of the axle pin hole 65. In this embodiment, the pivoting member 72 is comprised of 4140 steel, though it should be understood that other suitable materials may be used for the pivoting member 72 within the scope of the herein-disclosed inventive concepts.

In this embodiment, the lower arm 16 comprises an articulating portion 90, i.e., the angular position of the lower arm 16 is adjustable with respect to horizontal. In FIGS. 1 and 2A, the articulating portion 90 is shown in a first angular position, which in this embodiment represents the maximum positive angular position of the articulating portion 90. Articulating portion angle A, which is measured between a first line drawn parallel to the top of the upper channel member 80 and a second line drawn parallel with horizontal, represents a measurement of the angular position of the articulating portion 90 with respect to horizontal. In this embodiment, the angle $A_1$ is equal to approximately +45 degrees from horizontal.

Figure 2B:
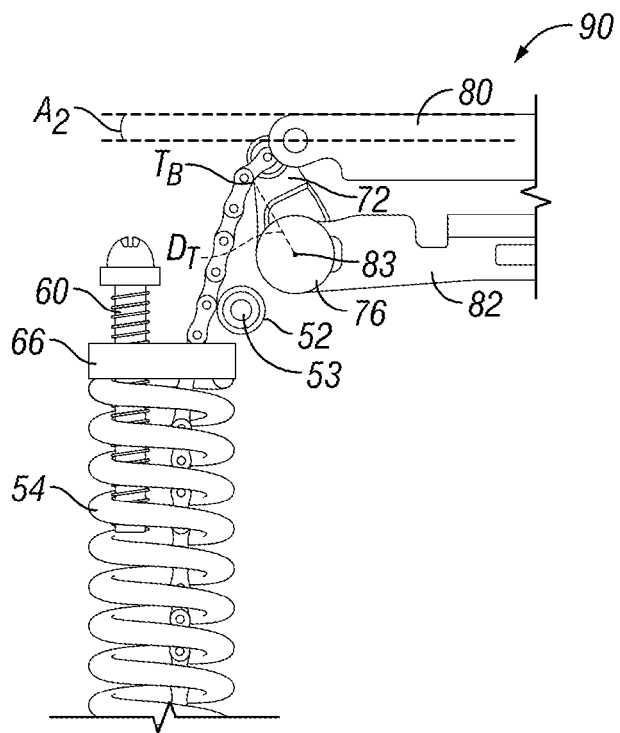
FIG. 2B is a side view of some components of the extension arm of FIG. 1 with the articulating portion in a second angular position.
Figure 2C:
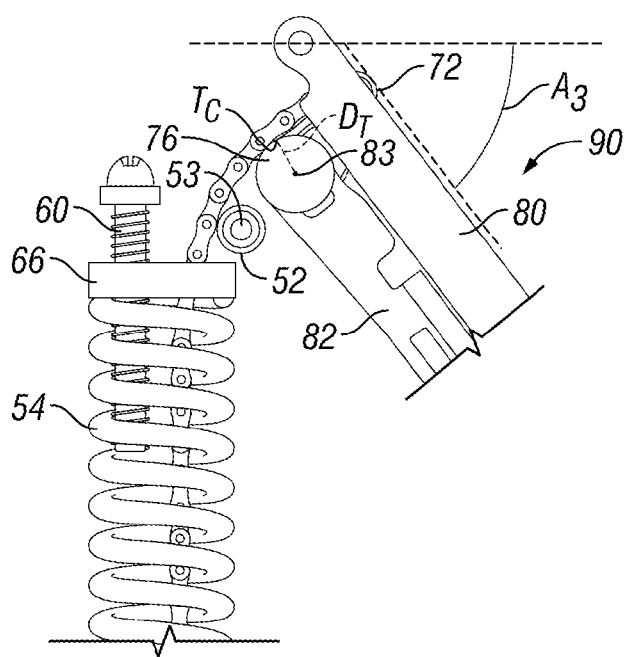
FIG. 2C is a side view of the components of the extension arm shown in FIG. 2B, with the articulating portion in a third angular position.

FIGS. 2B and 2C depict the articulating portion 90 in additional angular positions, corresponding respectively with articulating portion angles $A_2$ and $A_3$. In FIG. 2B, the articulating portion 90 is shown in a second angular position corresponding with articulating portion angle $A_2$. Angle $A_2$ is equal to 0 degrees from—i.e., parallel with—horizontal. In FIG. 2C, the articulating portion 90 is shown in a third angular position corresponding with articulating portion angle $A_3$. Angle $A_3$ is equal to −45 degrees from horizontal. In this embodiment, this angle represents the maximum negative angular position of the articulating portion 90. Thus, in this embodiment, the articulating portion 90 is adjustable to angles between +45 and −45 degrees from horizontal, such that the articulating portion 90 has an angular range of 90 degrees. It should be understood that in other embodiments, the angular range of the articulating portion 90 may be greater or lesser than the above-noted angular range, have greater or lesser absolute values for its maximum positive and maximum negative angular positions, or have maximum positive and maximum negative angular positions with absolute values that are not equal.

As the articulating portion 90 is rotated through its range of angular positions, the pivoting member 72 pivots about the axle pin 76 in an amount corresponding with the amount of angular adjustment of the articulating portion 90. For example, as the articulating portion is rotated from its maximum positive angular position (as shown in FIG. 2A) to its maximum negative angular position (as shown in FIG. 2C), the axle pin 76, and by extension the attached pivoting member 72, is rotated a corresponding amount (see, e.g., the relative positions of the articulating portion 90 and the pivoting member 72 in FIGS. 2A, 2B, and 2C).

The approximate route of the chain 48 when the articulating portion 90 is in its various angular positions is shown by a comparison of FIGS. 2A-2C. When the articulating portion 90 is in its maximum angular position (as shown in FIG. 2A), the chain 48 does not come in contact with the link roller 52. At some point between its +45 and 0 degree positions, the rotation of the pivoting member 72 moves the chain 48 towards the link roller 52 such that the chain 48 contacts the link roller 52. The chain 48 stays in contact with the link roller 52 through all negative angular positions of the articulating portion 90. In other words, in this embodiment, the link roller 52 comes in contact with the chain 48 when the angular position of the articulating portion 90 has a first set of values and does not come in contact with the chain 48 when the angular position of the articulating portion 90 has a second set of values. The first set of values may be, for example, in the range of approximately +45 degrees to approximately +10 degrees, and the second set of values may be, for example, in the range of +10 degrees to −45 degrees.

To calibrate the spring at the correct tension for the appropriate mass of the attached user device, the user brings the articulating portion 90 to a horizontal angular position (as shown in FIG. 2B) and pre-loads the appropriate amount of tension on the spring 54 so that the articulating portion 90 stays in the horizontal angular position while remaining freely adjustable upward or downward without difficulty. Since the spring 54 is captive within the spring tube 64, compression of the spring 54 transfers an amount of force to the chain 48 (via the washer 44, which in turn presses on the chain compression pin 42) corresponding with the amount of restorative force generated by the spring 54 in its compressed state. The force that is transferred to the chain 48 is transferred along the length of the chain 48 and acts on the pivoting member 72 via the connecting pin 75. The force transferred to the pivoting member 72 in turn maintains the rotational position of the axle pin 76, which in turn supports the angular position of the articulating portion 90 (via interaction with the lower channel member 82). As discussed in further detail below, the force of the spring 54 acting on the chain 48 thus supplies a necessary amount of counterbalance force to the pivoting member 72 to support the mass of the attached user device (and any intermediate components, e.g., the lower arm 16, the upper arm 18, the tilter 20, and the device mount 22) throughout the range of angular positions of the articulating portion 90. In the above fashion, the extension arm 10 may be adjusted to accommodate user devices of a range of different masses without the need for replacing any of the internal components thereof.

In some applications, it is desirable to closely approximate the quantity of counterbalance force that must be applied to an articulating portion in order to support the mass of the arm (and any devices attached thereto) as the arm is adjusted through its full range of angular positions. Such "counterbalance force approximation" increases the smoothness of the movement of the articulating portion, and reduces the risk that the arm will deviate from the selected angular position due to the applied counterbalance force being either too great or too small relative to the combined mass of the arm and any attached device(s). In accordance with the present inventive concepts, the counterbalance force approximation need not be exact; additional counter-balance force, if necessary, may be supplied by frictional forces exerted on the articulating portion 90 at, e.g., various pivot points.

In the embodiment shown in FIGS. 2A-2C, the shape of the pivoting member 72 and the distance $D_T$ between the centerpoint 83 of the axle pin slot 73 and the tangent points $T_A$, $T_B$, and $T_C$ of the chain 48 have been predetermined so as to dynamically vary the counterbalance force provided by the operation of the spring 54, chain 48, and pivoting member 72 as the angular position of the articulating portion 90 is adjusted throughout its operational range. The tangent points $T_A$, $T_B$, and $T_C$ are, respectively, the points at which the chain 48 comes out of contact with a surface of the pivoting member 72 in (i) +45 degree (FIG. 2A), (ii) 0 degree (FIG. 2B), and (iii) −45 degree (FIG. 2C) angular positions of the articulating portion 90. As the articulating portion 90 is moved through its range of angular positions, the distance $D_T$ between the centerpoint 83 and the tangent point at a given angular position varies. In the embodiment shown in FIGS. 2A-2C, the distance $D_T$ decreases as the articulating portion 90 is moved from its positive 45 degree position to its negative 45 degree position.

As the articulating portion 90 is moved through its range of angular positions, a dynamically-changing object-mass force is generated on the articulating portion 90 that corresponds with the product of (a) the combined mass of the articulating portion 90, additional arm components, and the attached device and (b) the horizontal component of the length of the articulating portion 90. In mathematical terms, the object-mass force is=$(\cos A)(L_A)(m_{obj})$; where $(\cos A)$=the cosine of the angle A between horizontal and the angular position of the articulating portion 90 (see, e.g., angles $A_1$, $A_2$, and $A_3$ in FIGS. 2A-2C); ($L_A$)=the length of the articulating portion; and ($m_{obj}$)=the combined mass of the articulating portion 90, additional arm components, and any attached devices. To counteract the object-mass force in accordance with the present inventive concepts, a dynamic counter-balance force is generated via operation of the spring 54, chain 48, and pivoting member 72. The counter-balance force is measured by finding the product of (a) the restorative force generated by the spring 54 and (b) the tangent distance $D_T$ at various angular positions of the articulating portion 90. In mathematical terms, the counter-balance force is=$(s)(x)(D_T)$, where (s)=the spring constant of the spring 54; (x)=the distance that an end of the spring 54 has moved from its equilibrium position; and ($D_T$)=the distance measured between the centerpoint 83 of the axle pin slot 73 and the point at which the chain 48 comes out of contact with a surface of the pivoting member 72 at various angular positions of the articulating portion 90 (see, e.g., tangent points $T_A$, $T_B$, and $T_C$ in FIGS. 2A-2C).

PCT International Application No. PCT/US10/38058, filed Jun. 9, 2010 and entitled "ARTICULATING MONITOR ARM WITH CABLE AND SPRING," which is incorporated herein by reference as if fully set forth, teaches an inventive concept that is similar to the present inventive concept and employs the same mathematical formulae but that describes, inter alia, embodiments of an extension arm that employ a cable that runs along a pivoting member and terminates within the articulating portion of said extension arm. The above-noted PCT International Application sets forth the force-balancing concept and related mathematical formulae in greater detail than the present application. It should be understood that the mathematical formulae and inventive concepts disclosed in the above-noted PCT International Application have direct application to the present disclosure.

Figure 4:
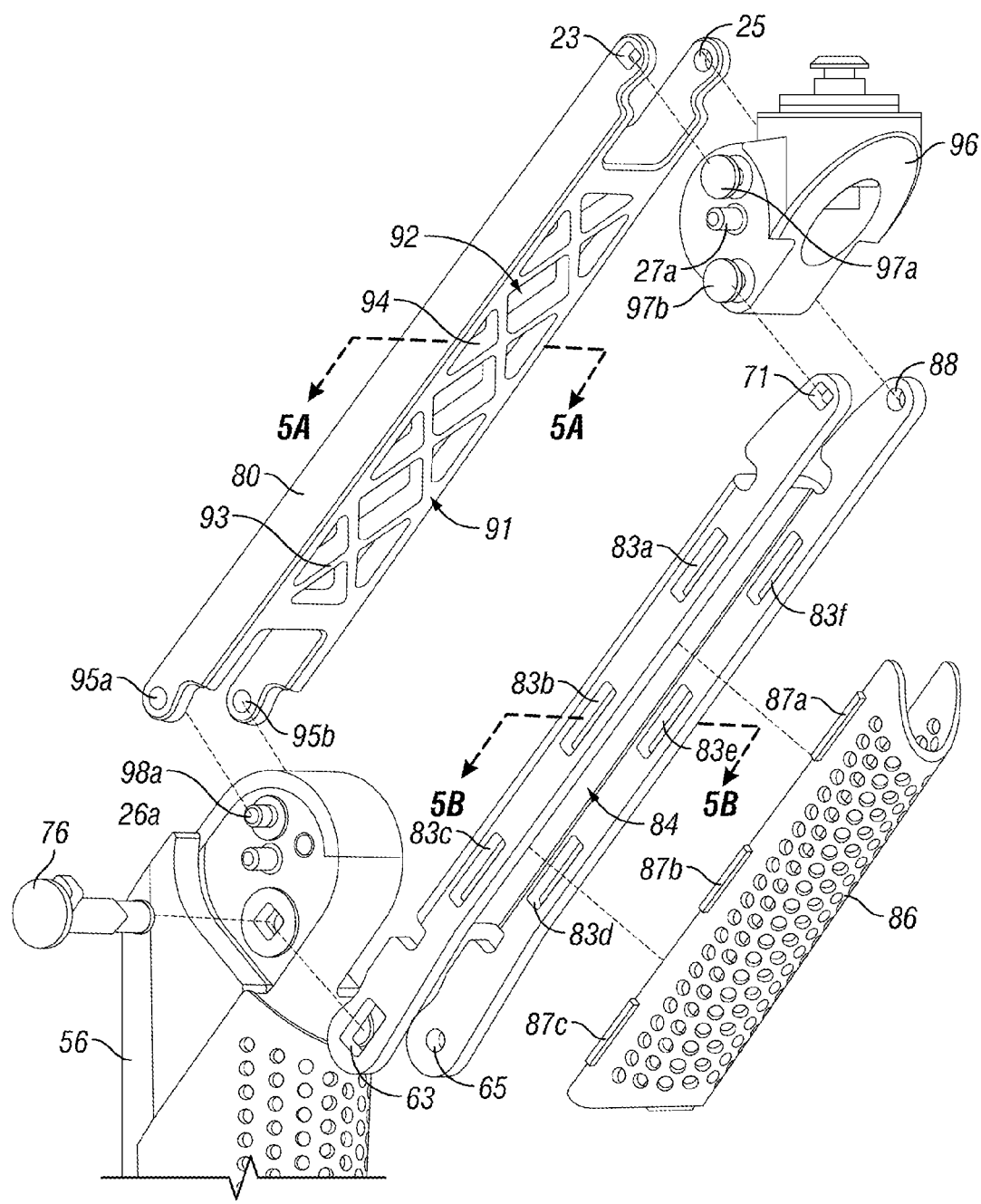
FIG. 4 is a partial exploded view of some components of the extension arm of FIG. 1.

In this embodiment, the lower arm 16 is comprised of an upper channel member 80, the lower channel member 82, the first endcap 56, and the second endcap 96 (see FIG. 4). The upper channel member 80 is connected to the first endcap 56 via a pair of endcap pins 98a, 98b. Endcap pin 98a attaches between a pin hole 69a on the endcap 56 and a pin hole 95a on the upper channel member 80, and endcap pin 98b attaches between a pin hole 69b on the endcap 56 and a pin hole 95b on the upper channel member 80. The pin holes 95a, 95b are aligned with another, and the pin holes 69a, 69b are aligned with each other. Because the endcap pins 98a, 98b and the pin holes 95a, 95b are cylindrical in shape, the upper channel member 80 rotates independently of the endcap 56 as the angular position of the upper channel member 80 is adjusted. Suitable bushings (not labeled), which in this embodiment are made of plastic, are included at respective connection points between the upper channel member 80 and the endcaps 56, 96 to prevent metal-on-metal contact. The bushings may also be used to apply friction to movement of the upper channel member 80, if necessary, in order to provide additional counter-balance force.

The upper channel member 80 is connected to the second endcap 96 via an endcap pin 97a. The endcap pin 97a has a rectangular portion (not shown) which fits snugly within a pin hole 23 on the upper channel member 80, and a cylindrical portion (not shown) which passes through and freely rotates within a pin slot (not shown) in the second endcap 96 and a pin hole 25 on the upper channel member 80. In this embodiment, the pin hole 23 is rectangular and is sized to complement the rectangular portion of the endcap pin 97a. The endcap pin 97a is held in place by a pin retainer (not shown), which attaches around the end of the cylindrical portion of the endcap pin 97a which extends out of the pin hole 25. The interaction of the rectangular portion of the endcap pin 97a and the pin hole 23 (along with the interaction of an endcap pin 97b and a pin hole 71 on the lower channel member 82) ensures that the top surface (not labeled) of the second endcap 96 stays parallel with horizontal throughout the entire angular range of positions of the upper channel member 80.

As noted above, the lower channel member 82 is connected to the first endcap 56 via the axle pin 76. Because of the rectangular cross-sectional shapes of the hole-engaging portion 77 of the axle pin 76 and the complementary-shaped axle pin hole 63, adjustment of the angular position of the lower channel member 82 will affect the rotational position of the axle pin 76. The lower channel member 82 is connected to the second endcap 96 via an endcap pin 97b. The endcap pin 97b has a portion with a rectangular cross-sectional area (not shown) which fits snugly within a pin hole 71 on the lower channel member 82, and a cylindrical portion (not shown) which passes through and freely rotates within a pin slot (not shown) in the second endcap 96 and a pin hole 88 on the lower channel member 82. In this embodiment, the pin hole 71 is rectangular in cross-section and is sized to complement the rectangular portion of the endcap pin 97b. The endcap pin 97b is held in place by a pin retainer (not shown), which attaches around the end of the cylindrical portion of the endcap pin 97b which extends out of the pin hole 88. The interaction of the rectangular portion of the endcap pin 97b and the pin hole 71 (along with the interaction of the endcap pin 97a and the pin hole 23 on the upper channel member 80) ensures that the top surface (not labeled) of the second endcap 96 stays parallel with horizontal throughout the entire range of angular positions of the lower channel member 82. Suitable bushings (not labeled), which in this embodiment are made of plastic, are included at respective connection points between the lower channel member 82 and the endcaps 56, 96 to prevent metal-on-metal contact. These bushings may also be used to apply friction to movement of the lower channel member 82, if necessary, in order to provide additional counter-balance force.

The connections between the endcaps 56, 96 and the upper 80 and lower 82 channel members maintain the articulating portion 90 in a parallelogram shape as the articulating portion 90 is moved throughout its range of angular positions. In other words, the articulating portion 90 is configured to maintain a substantially constant relative rotational position between the endcaps 56, 96 throughout the range of angular positions. Stated yet another way, each of the endcaps 56, 96 has a longitudinal axis, and these two longitudinal axes remain parallel as the articulating portion 90 is moved throughout its range of angular positions. It should be understood that this relationship between the endcaps exists in all of the herein disclosed embodiments.

Figure 5A:
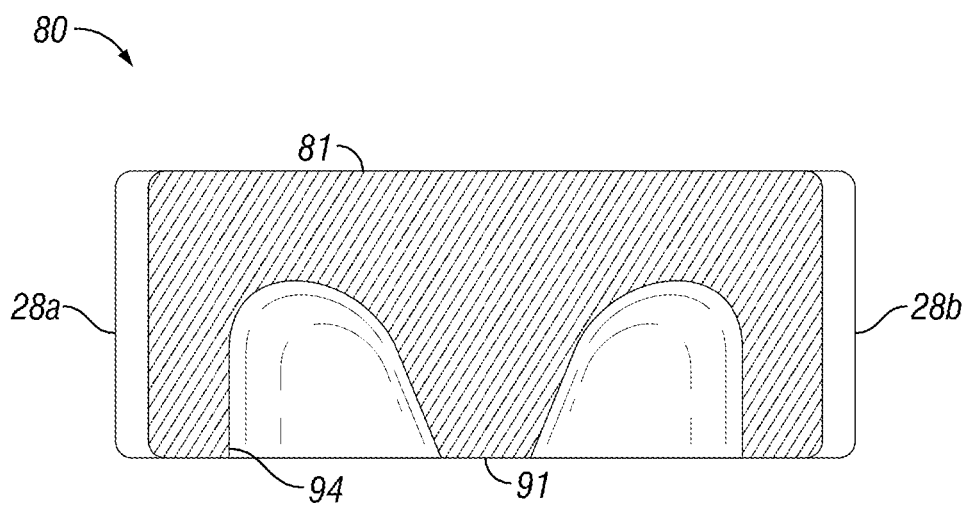
FIG. 5A is a sectional view taken along line 5A-5A of FIG. 4.

In this embodiment, both the upper channel member 80 and the lower channel member 82 have an approximately "U"-shaped cross-sectional profile, with the open part of the "U"-shape aimed generally downward. With reference to FIGS. 4 and 5A, the upper channel member 80 has an upper surface 81, a lower surface 91, and a pair of sidewalls 28a, 28b. In this embodiment, the upper surface 81 is substantially planar and unadorned. The lower surface 91 includes a reinforcement structure 92 which includes a plurality of cross-members 93 which extend between the sidewalls 28a, 28b to form a pattern of crossrib cells 94 which, in this embodiment, are either triangular- or diamond-shaped. In this embodiment, the cross-members 93 extend obliquely, i.e., not perpendicularly, to the sidewalls 28a, 28b. In alternate embodiments, the cross-members 93 could extend in any possible direction from the sidewalls 28a, 28b and could be of any suitable shape in order to comprise the reinforcement structure 92.

Figure 5B:
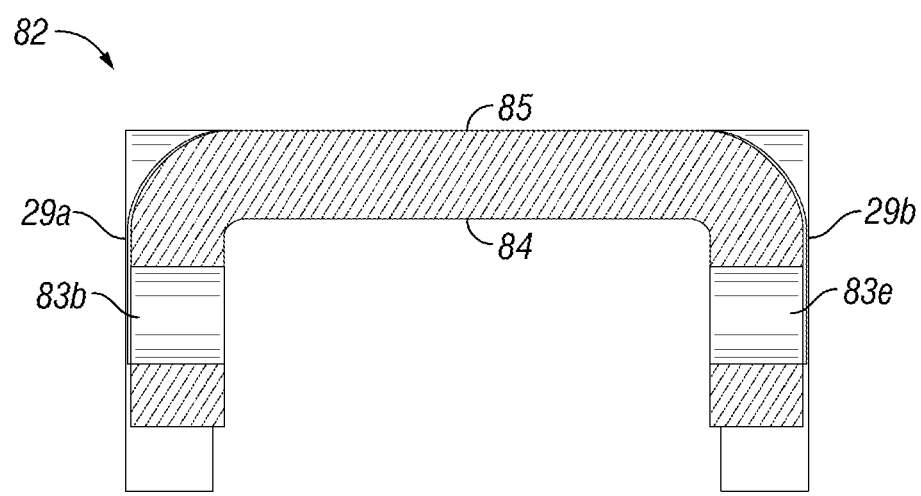
FIG. 5B is a sectional view taken along line 5B-5B of FIG. 4.

With reference to FIGS. 4 and 5B, the lower channel member 82 has an upper surface 85, a lower surface 84, and a pair of sidewalls 29a, 29b. In this embodiment, both the upper surface 85 and the lower surface 84 are substantially planar and unadorned. The sidewall 29a includes three slots 83a-83c, and the sidewall 29b includes three slots 83d-83f. These slots 83a-83c, 83d-83f are used to support respective tabs 87a-87c, 87d-87f (87d-87f not shown) located on a device cable cover 86. The device cable cover 86 is biased to be sized so as to have its tabs 87a-87f fit snugly within the respective slots 83a-83f. Due to the "inverted-U" shape of the lower channel member 82 and the location of the slots 83a-83f, the device cable cover 86 is at least partially concealed behind the sidewalls 29a, 29b of the lower channel member 82 when installed. This minimizes the size of the visual profile of the lower arm 16, while providing desirable cable-management features. To install the device cable cover 86 on the lower channel member 82, the user holds the user cables in position along the lower surface 84 of the lower channel member 82, compresses the sides of the device cable cover 86 together so that opposing pairs of tabs 87a/87f, 87b/87e, and/or 87c/87d move towards each other, moves the device cable cover 86 in position inside the sidewalls 29a, 29b of the lower channel member 82, and then uncompresses the sides of the device cable cover 86 so that the tabs 87a-87f bias themselves into the respective slots 83a-83f. The device cable cover 86 may be used to at least partially conceal device cables from external view as they are routed about the lower arm 16. In this embodiment, the device cable cover 86 has a plurality of perforations (not labeled) for aesthetic purposes, which match the perforations found on the device cable cover 58 of the base portion 14. In alternate embodiments, the perforations on the device cable cover 86 could be omitted, or the device cable cover 86 may be omitted entirely.

Due to the placement of all of the counterbalance force-supplying components of the extension arm 10 in the base portion 14, in this embodiment the lower surface 91 of the upper channel member 80 and the upper surface 85 of the lower channel member 82 are able to be brought in very close proximity to one another. Only a small space is left between the upper 80 and lower 82 channel members to prevent these two components from rubbing together. The space between the upper 80 and lower 82 channel members is small enough such that it is insufficient to allow the passage of a device cable therethrough. As a result of the present inventive concepts, the articulating portion 90 of the extension arm 10 is capable of having a very slim design profile. As flat-screen monitors have become thinner and lighter, the desire to have an extension arm 10 that matches the slim monitor profile has increased. The herein enclosed embodiments address this goal.

As shown in FIG. 1, an arm cover 24 attaches over the articulating portion 90 to hide the components of the articulating portion 90 from external view. The arm cover 24 has two pairs of aligned depressions (not shown) on inner sidewalls thereof, which align respectively with the protrusions 26a, 26b (26b not shown) located on the first endcap 56 and the protrusions 27a, 27b (27b not shown) located on the second endcap 96.

Figure 7:
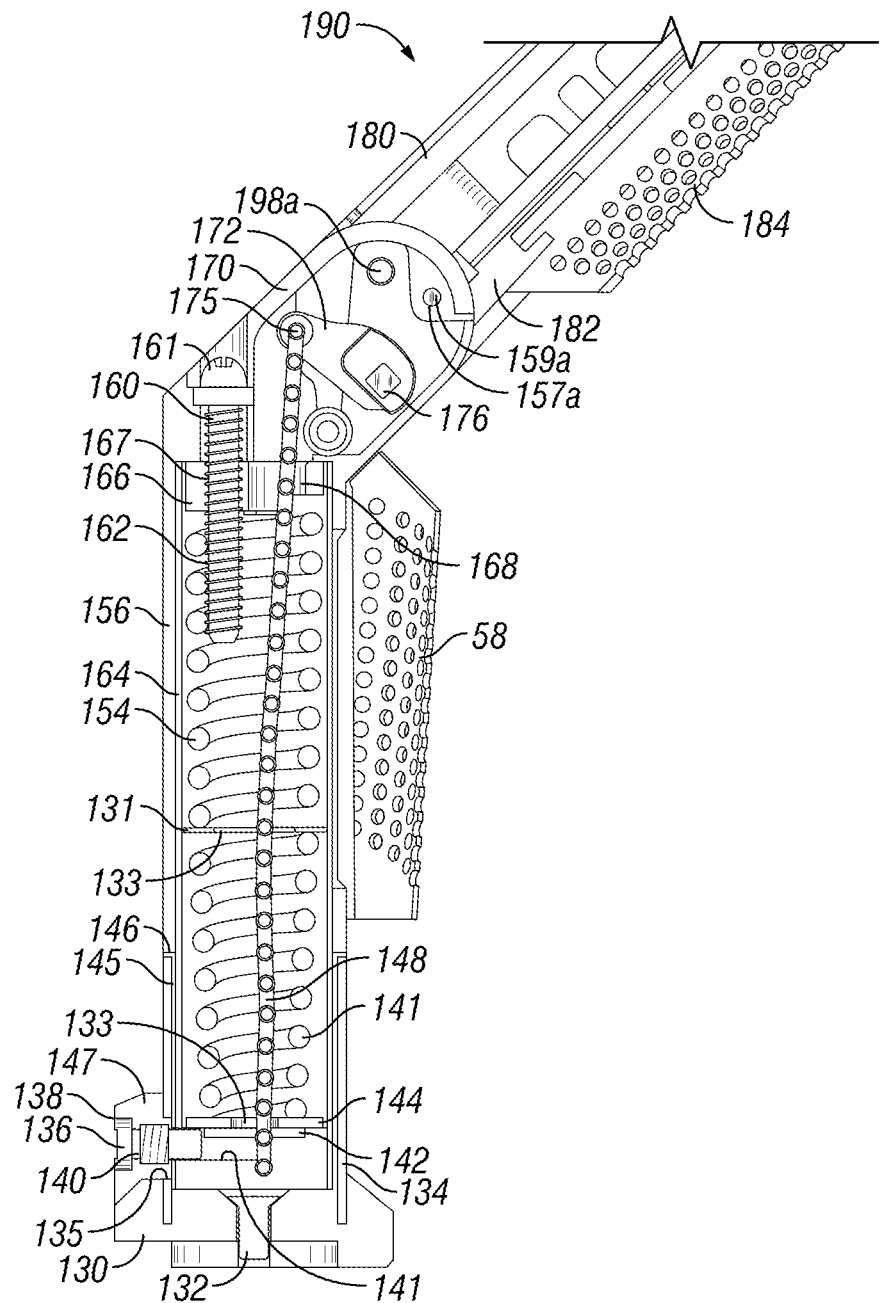
FIG. 7 is a sectional view of a second embodiment of an extension arm in accordance with the present inventive concepts.

FIG. 7 shows a second embodiment of a base portion in accordance with the present inventive concept. In this embodiment, elements shared with the first embodiment (extension arm 10) are represented by reference numerals increased by factors of 100. For example, the pivoting member 72 of FIG. 2A corresponds to the pivoting member 172 of FIG. 7.

The base portion of FIG. 7 is identical in primarily all respects to the base portion of FIG. 2A with the exception of the spring assembly discussed below. In this embodiment, a first spring 154 and a second spring 141 are located within a spring tube 164. The springs 154, 141, are separated by a spring separator 131, which in this embodiment approximates a flat washer with a hole 133 located at the center thereof to permit the passage of a chain 148 therethrough. In further alternative embodiments, the spring separator 131 may be of any suitable shape so as to remain properly oriented (i.e. transverse to the path of the chain 148 as shown in FIG. 7) while staying firmly in contact with both springs 154, 141. In this embodiment, both the first spring 154 and the second spring 141 are conical in shape. Because the springs 154, 141 have non-cylindrical shapes, they each have a non-constant spring rate, and therefore could be used to generate non-constant amounts of restorative force as the spring is compressed a unit distance. A combination of two or more springs, such as those of the present embodiment, may be used to accommodate greater masses on the extension arm than could a single-spring system. It should be understood that any combination of number or types of springs could be included in the spring tube within the scope of the present inventive concepts, for example any combination of cylindrical, conical, hourglass, or barrel-shaped springs.

Additional Aspects of the Inventive Concepts

While aspects of the present invention have been described above in connection with the preferred embodiments of the various figures, it is to be clearly understood that other similar embodiments may be used or modifications and additions may be made to the described embodiments for performing the same function of the present inventive concepts without deviating therefrom. The claimed inventive concepts, therefore, should not be limited to any single embodiment, but rather should be construed in breadth and scope in accordance with the appended claims. For example, the following aspects should also be understood to be a part of this disclosure:

Aspect 1: An extension arm having an articulating portion for supporting an object, the extension arm comprising: a base member that is releasably connectable to a support surface; an endcap that surrounds the base member, the endcap containing a spring therein, the spring having a central cavity located interior to a coiled portion thereof; a pivoting member attached to the arm, the pivoting member adapted to rotate with the articulating portion within the endcap as an angular position of the articulating portion is adjusted, the pivoting member located exterior to and on a first side of the central cavity; and a rigid element that runs through the central cavity, wherein a first end of the rigid element located exterior to and on the first side of the central cavity is manipulated by movement of the pivoting member, and a second end of the rigid element is attached to the endcap approximately at or exterior to a second side of the central cavity.

Aspect 2: The extension arm of Aspect 1, wherein the rigid element is attached at the first end to the pivoting member.

Aspect 3: The extension arm of either Aspect 1 or Aspect 2, wherein the rigid element is a bicycle-style chain.

Aspect 4: The extension arm of any one of Aspects 1-3, wherein the pivoting member is attached to a lower channel member of the articulating portion via an axle pin.

Aspect 5: The extension arm of Aspect 4, wherein the axle pin has a shaft, and at least a portion of the shaft has a non-circular cross-sectional area.

Aspect 6: The extension arm of any one of Aspects 1-5, further comprising a roller that comes in contact with the rigid element when the angular position has a first set of values and does not come in contact with the rigid element when the angular position has a second set of values.

Aspect 7: The extension arm of any one of Aspects 1-6, wherein the rigid element, spring, and pivoting member act to approximately counterbalance a combined mass of the articulating portion and object as the angular position of the articulating portion is adjusted by dynamically changing the rate of compression or extension of the spring via interaction of the first end of the rigid element and the pivoting member.

Aspect 8: An extension arm having an articulating portion for supporting an object, the extension arm comprising: an endcap located at a first end of the articulating portion, the endcap having at least two attachment points for connecting with the articulating portion and a pivoting member located therein; a spring tube located interior to the endcap, the spring tube enclosing a spring therein; and a rigid element that runs through a central cavity of the spring, attaches at a first end on a first side of the spring tube to the pivoting member, and attaches at a second end on a second side of the spring tube to the endcap.

Aspect 9: The extension arm of Aspect 8, wherein the rigid element is a bicycle-style chain.

Aspect 10: The extension arm of either of Aspect 8 or Aspect 9, wherein the spring and spring tube are oriented vertically when the extension arm is mounted to a horizontal support surface.

Aspect 11: The extension arm of any one of Aspects 8-10, wherein the endcap has a first section and a second section, wherein the first section contains the spring tube and spring, and the second section contains the at least two attachment points and the pivoting member, wherein the second section is angled with respect to the first section.

Aspect 12: The extension arm of any one of Aspects 8-11, further comprising a spring adjuster located at one of the first end or the second end of the spring tube, the spring adjuster permitting adjustment of a tension state of the spring via movement of the spring adjuster within the spring tube.

Aspect 13: The extension arm of any one of Aspects 8-12, wherein the spring has the approximate shape of a truncated cone.

Aspect 14: An extension arm for supporting an object, the extension arm comprising: a base member that is releasably connectable to a support surface; and a parallelogram portion connected to the base member, the parallelogram portion comprising a first endcap, a second endcap, an upper channel member, and a lower channel member, both the upper and lower channel members having a cross-sectional profile approximating a "U"-shape, a first surface corresponding with a closed side of the "U"-shape, and a second surface corresponding with an open side of the "U"-shape, the first and second surfaces directly opposing each other, wherein the second surface of both the upper and lower channel members face downwardly when the base member is mounted to a horizontal support surface.

Aspect 15: The extension arm of Aspect 14, wherein at least one of the upper and lower channel members further comprises reinforcement members located therein.

Aspect 16: The extension arm of either of Aspect 14 or Aspect 15, wherein at least one of the upper and lower channel members further comprises a cable cover, the cable cover being at least partially hidden from external view due to being at least partially nested within the "U"-shape of the upper or lower channel member.

The invention claimed is:

1. An extension arm for supporting an object, the extension arm comprising:
    an articulating portion, the articulating portion being comprised of upper and lower channel members that remain parallel to each other as an angular position of the articulating portion is adjusted,
    a base member that is releasably connectable to a support surface;
    an endcap that surrounds the base member, the endcap containing a spring therein, the spring having a central cavity located interior to a coiled portion thereof;
    a pivoting member attached to the arm, the pivoting member adapted to rotate with the articulating portion within the endcap as the angular position of the articulating portion is adjusted, the pivoting member located exterior to and on a first side of the central cavity; and
    a rigid element that runs through the central cavity, wherein a first end of the rigid element located exterior to and on the first side of the central cavity is manipulated by movement of the pivoting member, and a second end of the rigid element is attached to the endcap approximately at or exterior to a second side of the central cavity,
    wherein the rigid element is a bicycle-style chain.

2. The extension arm of claim 1, wherein the rigid element is attached at the first end to the pivoting member.

3. The extension arm of claim 1, wherein the pivoting member is attached to the lower channel member of the articulating portion via an axle pin.

4. The extension arm of claim 3, wherein the axle pin has a shaft, and at least a portion of the shaft has a non-circular cross-sectional area.

5. The extension arm of claim 1, further comprising a roller that comes in contact with the rigid element when the angular position has a first set of values and does not come in contact with the rigid element when the angular position has a second set of values.

6. The extension arm of claim 1, wherein the rigid element, spring, and pivoting member act to approximately counterbalance a combined mass of the articulating portion and object as the angular position of the articulating portion is adjusted by dynamically changing the rate of compression or extension of the spring via interaction of the first end of the rigid element and the pivoting member.

7. An extension arm supporting an object, the extension arm comprising:
    an articulating portion, the articulating portion being comprised of upper and lower channel members that remain parallel to each other as an angular position of the articulating portion is adjusted;
    an endcap located at a first end of the articulating portion, the endcap having at least two attachment points for connecting with the articulating portion and a pivoting member located therein;
    a spring tube located interior to the endcap, the spring tube enclosing a spring therein; and
    a rigid element that runs through a central cavity of the spring, attaches at a first end on a first side of the spring tube to the pivoting member, and attaches at a second end on a second side of the spring tube to the endcap,
    wherein the rigid element is a bicycle-style chain.

8. The extension arm of claim 7, wherein the spring and spring tube are oriented vertically when the extension arm is mounted to a horizontal support surface.

9. The extension arm of claim 7, wherein the endcap has a first section and a second section, wherein the first section contains the spring tube and spring, and the second section contains the at least two attachment points and the pivoting member, wherein the second section is angled with respect to the first section.

10. The extension arm of claim 7, further comprising a spring adjuster located at one of the first end or the second end of the spring tube, the spring adjuster permitting adjustment of a tension state of the spring via movement of the spring adjuster within the spring tube.

11. The extension arm of claim 7, wherein the spring has the approximate shape of a truncated cone.

12. The extension arm of claim 1, wherein both the upper and lower channel members have a cross-sectional profile approximating a "U"-shape, a first surface corresponding with a closed side of the "U"-shape, and a second surface corresponding with an open side of the "U"-shape, the first and second surfaces directly opposing each other, wherein the second surface of both the upper and lower channel members face downwardly when the base member is mounted to a horizontal support surface.

13. The extension arm of claim 7, wherein both the upper and lower channel members have a cross-sectional profile approximating a "U"-shape, a first surface corresponding with a closed side of the "U"-shape, and a second surface corresponding with an open side of the "U"-shape, the first and second surfaces directly opposing each other, wherein the second surface of both the upper and lower channel members face downwardly when the extension arm is mounted to a horizontal support surface.

14. The extension arm of claim 10, wherein the spring adjuster is located at the first end of the spring tube, and movement of the spring adjuster within the spring tube is affected by accessing the spring adjuster through a top side of the endcap.

* * * * *